United States Patent
Hoang et al.

(10) Patent No.: US 8,245,053 B2
(45) Date of Patent: Aug. 14, 2012

(54) METHODS AND SYSTEMS FOR BINDING A REMOVABLE TRUSTED PLATFORM MODULE TO AN INFORMATION HANDLING SYSTEM

(75) Inventors: Quy Hoang, Round Rock, TX (US); Mukund P. Khatri, Austin, TX (US); Pankaj Bishnoi, Austin, TX (US)

(73) Assignee: Dell Products, Inc., Round Rock, TX (US)

( * ) Notice: Subject to any disclaimer, the term of this patent is extended or adjusted under 35 U.S.C. 154(b) by 339 days.

(21) Appl. No.: 12/381,299

(22) Filed: Mar. 10, 2009

(65) Prior Publication Data
US 2010/0235648 A1    Sep. 16, 2010

(51) Int. Cl.
*G06F 21/00* (2006.01)
(52) U.S. Cl. ......... 713/189; 713/192; 713/193; 713/194
(58) Field of Classification Search .................. 713/189, 713/193, 192, 194
See application file for complete search history.

(56) References Cited

U.S. PATENT DOCUMENTS

| | | | | |
|---|---|---|---|---|
| 5,448,045 | A * | 9/1995 | Clark ............................ | 235/382 |
| 6,889,298 | B2 | 5/2005 | Elliot et al. | |
| 7,382,880 | B2 * | 6/2008 | Angelo et al. ................ | 380/259 |
| 7,461,249 | B1 * | 12/2008 | Pearson et al. ................ | 713/156 |
| 2003/0088748 | A1 | 5/2003 | Elliott et al. | |
| 2005/0010811 | A1 * | 1/2005 | Zimmer et al. ................ | 713/201 |
| 2005/0257073 | A1 * | 11/2005 | Bade et al. .................... | 713/193 |
| 2005/0289343 | A1 | 12/2005 | Tahan | |
| 2006/0020781 | A1 | 1/2006 | Scarlata et al. | |
| 2007/0016766 | A1 | 1/2007 | Richmond et al. | |
| 2008/0130895 | A1 * | 6/2008 | Jueneman et al. ............ | 380/277 |
| 2008/0178007 | A1 * | 7/2008 | Bumpus et al. ............... | 713/185 |
| 2008/0276326 | A1 * | 11/2008 | Bhansali et al. ................ | 726/36 |
| 2011/0040961 | A1 * | 2/2011 | Badaoui-Najjar et al. ........ | 713/2 |
| 2011/0093693 | A1 * | 4/2011 | Ibrahim et al. .................... | 713/2 |

OTHER PUBLICATIONS

Infineon, "Trusted Platform Module", Printed From Internet Feb. 12, 2009; 4 pgs.

* cited by examiner

*Primary Examiner* — Kaveh Abrishamkar
*Assistant Examiner* — Ngoc D Nguyen
(74) *Attorney, Agent, or Firm* — O'Keefe, Egan, Peterman & Enders LLP

(57) ABSTRACT

Methods and systems for binding a removable trusted platform module (TPM) subsystem module to an information handling system to provide a core root of trust for the information handling system without requiring soldering down or other hard and permanent (non-removable) attachment of a TPM device to the information handling system planar (e.g., motherboard). The removable TPM subsystem module may be a plug-in module that may be removed from the information handling system planar (e.g., motherboard), while at the same time maintaining the transitive chain of trust, and being capable of remotely attesting its trusted state. An information handling system platform may be provided that has the capability and flexibility of supporting multiple TPMs on the same system planar.

31 Claims, 3 Drawing Sheets

METHODS AND SYSTEMS FOR BINDING A REMOVABLE TRUSTED PLATFORM MODULE TO AN INFORMATION HANDLING SYSTEM

FIELD OF THE INVENTION

This invention relates generally to information handling systems and, more particularly, to trusted platform modules used with information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A Trusted Platform Module (TPM) is a hardware device that provides secure generation and storage of cryptographic keys for an information handling system, such as desktop computer, notebook computer, server, etc. A TPM also limits the use of cryptographic keys to signing (i.e., verification or encryption/decryption), as well as provides a Hardware Random Number Generator. Other capabilities of a TPM include remote attestation, sealing, binding, hardware authentication and sealed storage. Integrated into an information handling system platform, the TPM is part of the Core Root of Trust of the platform to ensure that the platform operates in a secure state, allowing it to remotely attest that the platform can be trusted based on a consideration of its hardware components (e.g., processor and chipset) and software components (e.g., operating system, firmware). TPMs have traditionally been permanently attached by soldering to the motherboard of the information handling system.

In some cases it may be desirable or required that different types of TPM devices be selected and employed for different end use applications, e.g., particular platforms destined for a given foreign country may be required to employ a TPM device that is manufactured and certified by that given foreign country. This requires providing different type system boards (i.e., with different types of corresponding TPM devices) for the same type of platform. The appropriate type of system board then must be selected during assembly of a given platform based on the intended end-use application for the given platform.

SUMMARY OF THE INVENTION

Disclosed herein are methods and systems for binding a removable TPM subsystem module to an information handling system such that it provides a core root of trust for the information handling system without requiring soldering down or other hard and permanent (non-removable) attachment of the TPM to the information handling system planar (e.g., motherboard). The removable TPM subsystem module may be a plug-in module (e.g., mounted on a PCB card) that may be removed from the information handling system planar (e.g., motherboard), while at the same time maintaining the transitive chain of trust, and being capable of remotely attesting its trusted state. Using the disclosed methods and systems, an information handling system platform may be provided that has the capability and flexibility of supporting multiple types of TPM subsystem modules (e.g., removable TPM subsystem modules manufactured in different countries, removable TPM subsystem modules manufactured by different companies, removable TPM subsystem modules including different types and/or configurations of TPM chip devices, etc.) on the same system planar.

The disclosed systems may be advantageously implemented to facilitate selection and use of different types of TPM devices for different end use applications in combination with a single type of planar employed for different systems. This is advantageous from the standpoint of cost and inventory management purposes. The disclosed systems and methods may be so implemented using a plug-in or removable TPM subsystem module that meets Trusted Computing Group (TCG) specifications which require that the platform provide acceptable binding between the TPM and the planar.

In the practice of the disclosed methods and systems, a removable TPM subsystem module (e.g., provided in the form of a plug-in module) may be provided with non-volatile storage (e.g., electrically erasable programmable read-only memory—EEPROM or serial electrically erasable programmable read-only memory—SEEPROM, etc.) to store binding data and to create Trusted Computing Group (TCG) compliant binding for an information handling system. In one exemplary embodiment, the non-volatile storage of a removable TPM subsystem module may be configured to be accessible to system BIOS (e.g., through the I$^2$C bus), and may be permanently write-protected by BIOS. In another exemplary embodiment, a server baseboard management controller ("BMC") may be employed to access the non-volatile memory on the removable TPM subsystem module and to permanently write protect it.

In one embodiment, a removable TPM subsystem module (e.g., plug-in module) may be permanently bound to a system planar (e.g., motherboard) of an information handling system during system manufacturing, or otherwise prior to its deployment (e.g., user taking ownership), to provide a binding solution that meets the TCG identified requirements. In such an embodiment, each individual system planar may be provided with a unique identifier (e.g., code). A removable TPM subsystem module may then be bound to a given system planar (e.g., prior to or during assembly or prior to system deployment to a customer) by using the information handling system BIOS (or alternatively the BMC) to write the unique identifier of the system planar to the non-volatile memory of the TPM module, and then permanently write protecting the non-volatile memory of the EEPROM on the TPM module. Thereafter, at every system boot, the information handling BIOS (or BMC) will verify that the removable TPM subsystem module-to-system planar binding is still valid by comparing the unique identifier stored in the non-volatile memory of the TPM with the unique identifier of the system planar. If these compared values do not match, then the system BIOS (or BMC) may be configured to hold the removable TPM device in reset or take other corrective actions (e.g., such as temporarily or permanently disabling the removable TPM subsystem module, halting the system, notifying the server administrator, etc.).

In a further exemplary embodiment, security may be enhanced by storing an encrypted version or hash value or hash digest of the unique identifier of a given system planar in the non-volatile storage of the removable TPM subsystem module that is being bound to the given system planar, rather than by storing the unique identifier itself in the clear. Alternatively, system planar unique identifier may be replaced with another unique identifier (e.g., corresponding to electronic Part ID, service tag, MAC address for embedded NICs, etc.) or with a combination of different such identifiers prior to storage in non-volatile memory of a removable TPM subsystem module, as long as these identifiers are unique to that platform and are not reprogrammable, e.g., by a customer or end-user in the field. It will also be understood that a removable TPM subsystem module may also be configured to perform other platform security tasks, e.g., a removable TPM subsystem module may be provided with a main key that is required to unlock other keys such as may be employed to encrypt a hard drive or other information handling system components so that information on the hard drive or other component may not be accessed separately from the removable TPM subsystem module and the platform to which it is permanently bound.

In one respect, disclosed herein is an information handling system that includes a system planar. The system planar may in turn include a controller and a removable trusted platform module (TPM) subsystem module that is removably coupled to the system planar, the TPM subsystem module including a TPM device and non-volatile memory. Binding information unique to the system planar may be permanently written in the non-volatile memory of the removable TPM subsystem module, and the controller of the system planar may be configured to read the binding information from the non-volatile memory of the removable TPM subsystem module. The controller of the system planar may be configured to only allow the information handling system to boot if the binding information read back from the non-volatile memory of the removable TPM subsystem module matches unique information associated with the system planar.

In another respect, disclosed herein is a method of binding a removable trusted platform module (TPM) to a system planar of an information handling system, including: providing a system planar; providing a removable TPM subsystem module for the system planar, the removable TPM subsystem module including a TPM device and non-volatile memory; permanently writing binding information in the non-volatile memory of the removable TPM subsystem module, the binding information being unique to the system planar; reading the binding information from the non-volatile memory of the removable TPM subsystem module; and only allowing the information handling system to boot if the binding information read back from the non-volatile memory of the removable TPM subsystem module matches unique information associated with the system planar.

In another respect, disclosed herein is a removable TPM subsystem module, including: a TPM device configured to perform trusted platform module processing tasks; non-volatile memory coupled to the TPM device; and one or more connectors, the one or more connectors configured to removably mate with one or more corresponding connectors of a system planar of an information handling system such that the non-volatile memory communicates with a controller of the system planar.

DESCRIPTION OF ILLUSTRATIVE EMBODIMENTS

Figure 1:
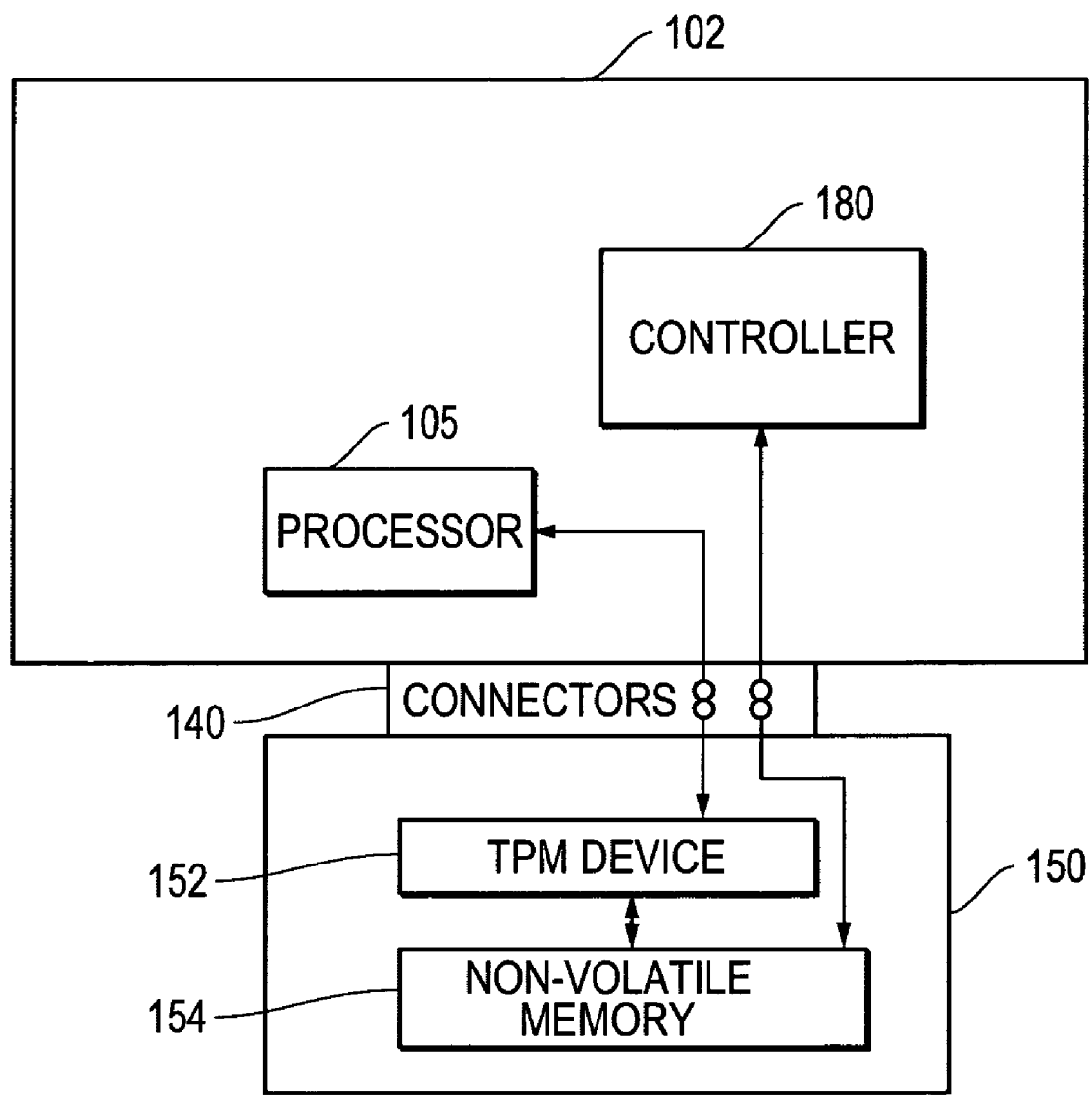
FIG. 1 is a simplified block diagram of an information handling system planar and removable TPM subsystem module according to one exemplary embodiment of the disclosed systems and methods.

FIG. 1 is a block diagram of an information handling system planar (e.g., motherboard) 102 and removable TPM subsystem module 150 of an information handling system as they may be configured according to one exemplary embodiment of the disclosed systems and methods. In this embodiment, system planar 102 includes processor (e.g., CPU) 105 and separate controller (e.g., embedded controller or BMC) 180 that are integrated or embedded as part of system planar 102. In one embodiment, processor 105 may be configured to execute an operating system (along with one or more system or user software applications) and to interface with a user, and BMC/Service Processor 180 may be configured to interface with hardware components of an information handling system that are external to system planar 102. A unique identifier (e.g., code) is assigned to or otherwise provided for each individual system planar 102 that is different from the unique identifier assigned to other system planars 102.

As further shown in FIG. 1, removable TPM subsystem module 150 is removably connected to system planar 102 by connectors 140. In this regard, removable TPM subsystem module 150 may be configured as a plug-in module or other type of removable card or module that is non-permanently attached to system board 102 via connectors 140. Removable TPM subsystem module 150 of FIG. 1 includes a TPM device 152 (e.g., TPM chip including TPM cryptographic processor or microcontroller together with associated memory), and TPM module non-volatile memory 154 (e.g., EEPROM, SEEPROM, etc.) as shown. Specific examples of TPM devices 152 that may be employed include, but are not limited to, TCG 1.2 compliant trusted platform modules (including an encapsulated microcontroller security chip) such as are available from Infineon Technologies AG of Munich Germany, e.g., such as Infineon SLB 9635 TT 1.2.

TPM microcontroller of TPM device 152 may be configured in this embodiment to perform TPM processing tasks, such as cryptographic key generation and control, remote attestation, sealing, binding, random number generation, hardware authentication, other security processing tasks, etc. TPM module non-volatile memory 154 of FIG. 1 may be configured for storage of TPM information, including binding information such as unique identifier, or hash of one or more unique identifiers, etc. Binding information to be stored in TPM module non-volatile memory 154 also includes system planar identification information which may be the unique identifier or based at least in part on the unique identifier of the individual system planar 102 to which TPM subsystem module 150 is connected. TPM subsystem module 150 is configured to interact during the boot process with host processor 105 in accordance with the TCG defined requirements for Secure Boot.

Still referring to FIG. 1, TPM module non-volatile memory 154 is coupled via connectors 140 (e.g., plug-in interconnects) to BMC/Service Processor 180 of system planar 102, and to TPM device 152. It will be understood that TPM module non-volatile memory 154 may be so coupled to BMC/Service Processor 180 via a dedicated signal conductor or via a bus line such as I²C bus. TPM module non-volatile memory 154 is also coupled as shown to TPM device 152, which is in turn coupled to processor 105 of system planar 102 by connectors 140.

Figure 2:
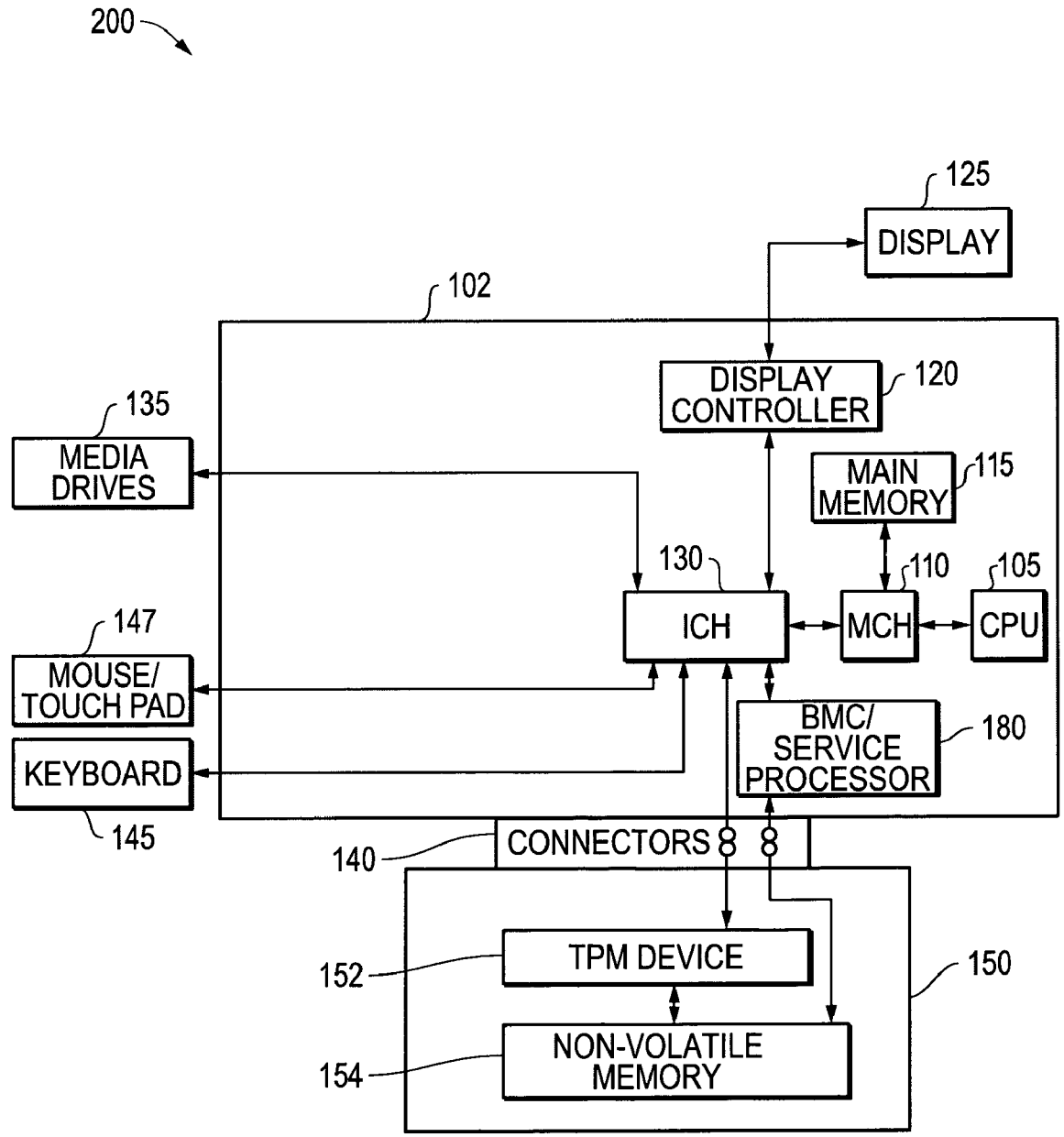
FIG. 2 is a simplified block diagram of an information handling system according to one exemplary embodiment of the disclosed systems and methods.

FIG. 2 is a block diagram of an information handling system 200 as it may be configured according to one exemplary embodiment of the disclosed systems. Information handling system 200 may be, for example, a desktop computer or other type of information handling system configured as a server. As shown, information handling system 200 includes a system planar 102 and a removable TPM subsystem module 150 such as described in relation to FIG. 1. As shown in FIG. 2, information handling system 200 of this exemplary embodiment includes a CPU 105 such as an Intel Pentium series processor, an Advanced Micro Devices (AMD) processor or one of many other processors currently available. A memory controller hub (MCH) chip 110 is coupled to processor 105 to facilitate memory and display functions. System memory 115 is coupled to MCH 110. An I/O controller hub (ICH) chip 130 is coupled to MCH chip 110 to facilitate input/output functions for the information handling system. Media drives 135 are coupled to ICH chip 130 to provide permanent storage for the information handling system. A display controller 120 is also coupled to ICH chip 130, and a display 125 (e.g., LCD display or other suitable display device) is coupled to display controller 120 to provide visual images to the user. Input devices such as a keyboard 145 and touchpad 147 are coupled to ICH chip 130 to enable the user to interact with the information handling system. A BMC/Service Processor 180 running system BIOS is also coupled to ICH chip 130. It will be understood that the configuration of FIG. 2 is exemplary only, and that an information handling system may be configured with fewer or additional components in addition to a system planar and removable TPM subsystem module.

Figure 3:
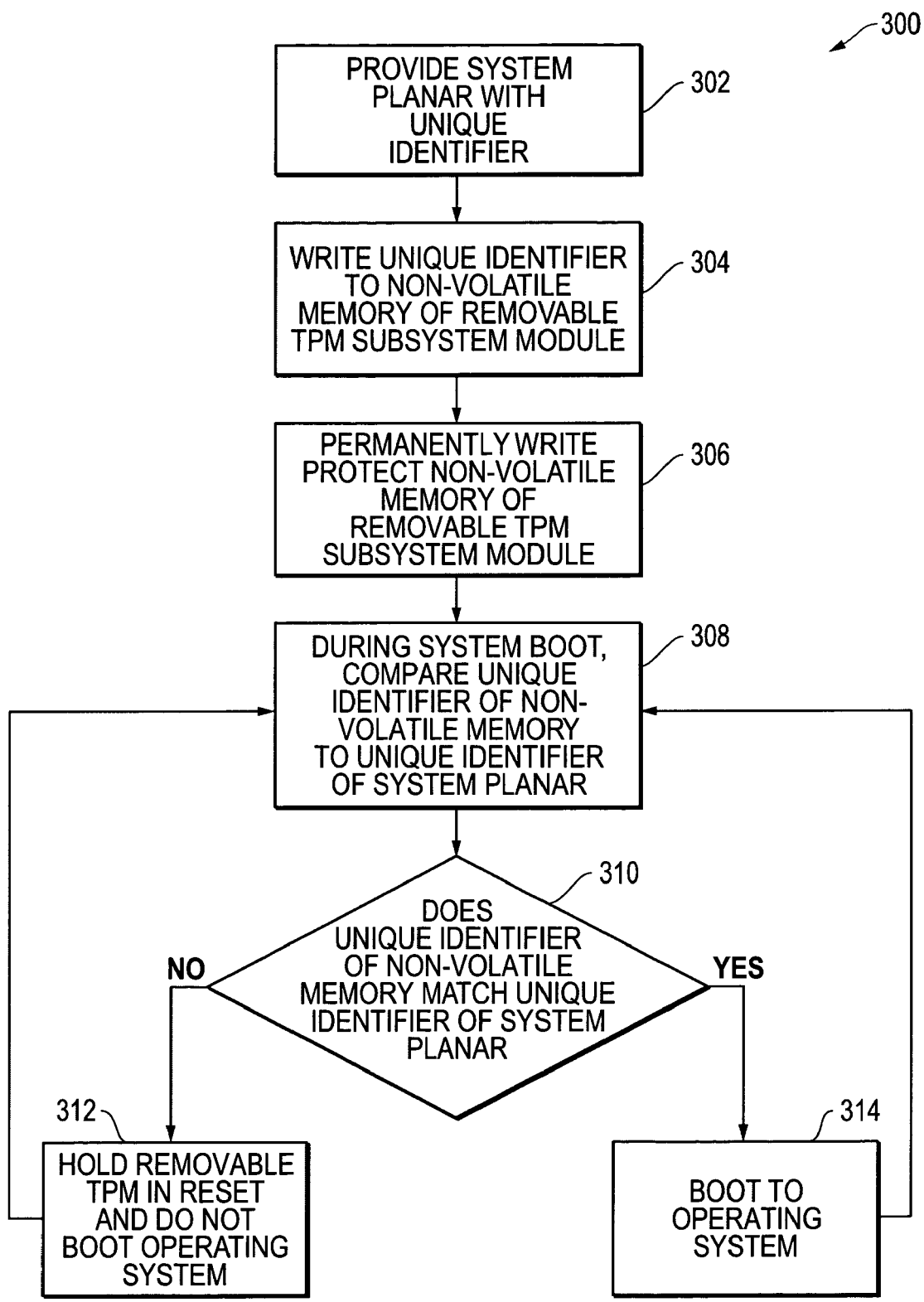
FIG. 3 illustrates methodology according to one exemplary embodiment of the disclosed systems and methods.

FIG. 3 illustrates one exemplary methodology 300 that may be implemented using the disclosed methods and systems to permanently bind a removable TPM subsystem module 150 (e.g., configured as a plug-in module) to a system planar (e.g., motherboard) 102 of an information handling system during system manufacturing, or otherwise prior to its deployment (e.g., user taking ownership), to provide a binding solution that meet TCG requirements. In this exemplary embodiment, a given system planar 102 is provided with a unique identifier (e.g., code such as ePPID or Service Tag, etc.) in step 302. This unique identifier may be provided so that it is permanent and unchangeable for the given system planar 102, and may be maintained within non-volatile memory like system field replaceable unit (FRU) or BIOS flash of the given system planar 102, either as itself or as encrypted information based on the actual unique identifier itself. In this form, the unique identifier is accessible to BMC/Service Processor 180 of system planar 102.

Next, the unique identifier of the given system planar 102 is written in step 304 to non-volatile memory 154 of a removable TPM subsystem module 150 that is electronically and removably coupled to the given system planar 102, for example, as shown in FIGS. 1 and 2. The unique identifier may be written to TPM module non-volatile memory 154 by a suitable BMC/Service Processor 180 (e.g., BIOS of embedded controller or BMC) that is part of the system planar 102 to which removable TPM subsystem module 150 is coupled. In one embodiment a unique identifier itself may be written to non-volatile memory 154 in step 304. However, it will be understood that any other information may be written to non-volatile memory 154 that is unique to a given system planar my be written to the non-volatile memory 154, e.g., an encrypted version or hash value or hash digest of the unique identifier of a given system planar, a combination of different identifiers, a replacement unique identifier that is linked to the original unique identifier of the given system planar, etc. Further it is also possible in another embodiment that a removable TPM subsystem module may be pre-programmed by permanently writing a unique identifier of a given system planar to the non-volatile memory of the removable TPM subsystem module prior to mating the removable TPM subsystem module with the system planar.

Next, in step 306, the TPM module non-volatile memory 154 is permanently write-protected by BMC/Service Processor 180 to complete binding of a given removable TPM subsystem module 150 to a given system planar 102. Once non-volatile memory 154 of a given removable TPM subsystem module 150 is so write-protected, the given removable TPM subsystem module 150 is configured not to function with any system planar 102 other than the given system planar 102 corresponding to the unique identifier or other unique information corresponding to the given system planar 102. It will be understood that steps 302 through 306 may be performed at any time prior to or during assembly of information handling system components or otherwise prior to deployment to a customer. In an alternative embodiment, an information handling system may be delivered to a customer prior to binding of a removable TPM subsystem module 150 to the system planar 102. In such an alternative embodiment, the customer may perform one or more of steps 302 to 306 prior to first use of the information handling system operating system. As such, the disclosed methods and systems may be so practiced as to allow a removable TPM subsystem module to be selected from a number of different types of removable TPM subsystem modules (e.g., having a different type of TPM chip device) for use with a given system planar, e.g., during build-to-order assembly process to select a particular type of removable TPM subsystem module for a particular end use or customer desire.

Referring to step 308 of FIG. 3, during every subsequent attempted boot of the information handling system, BMC/Service Processor 180 of the information handling system (e.g., BIOS of embedded controller or BMC) verifies that the binding of removable TPM subsystem module 150 to system planar 102 is still valid by comparing the unique identifier (or other information unique to the given system planar 102) in non-volatile memory 154 of a removable TPM subsystem module 150 with the known unique identifier or other corresponding unique information for system planar 102. If this compared information is found not to match in step 310, then BMC/Service Processor 180 (e.g., BIOS or BMC) holds the removable TPM subsystem module 150 in reset in step 312 and does not proceed with the current attempt to normally boot the operating system of the information handling system. Instead, the server administrator may be notified of the mismatch and/or methodology 300 may continue with a crippled system boot or halt the system boot process entirely. However, if the compared information is found to match in step 310, then BMC/Service Processor 180 proceeds with booting of the operating system of the information handling system in step 314 as shown. Methodology for each subsequent boot attempt is indicated by the arrows returning to step 308 from each of steps 312 and 314.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. An information handling system comprising:
    a system planar, said system planar comprising a controller; and
    a removable trusted platform module (TPM) subsystem module that is removably coupled to said system planar, said TPM subsystem module comprising a TPM device and non-volatile memory that is separate from the TPM device, the TPM device itself including a TPM cryptographic processor or microcontroller together with associated memory;
    wherein binding information unique to said system planar is permanently written in said non-volatile memory that is separate from the TPM device of said removable TPM subsystem module;
    wherein said controller of said system planar is coupled by a dedicated direct communication path that is separate from the TPM device to directly read said non-volatile memory of said removable TPM subsystem module across the separate dedicated direct communication path in a manner that is separate and independent from the TPM device, the controller being further configured to read said binding information from said non-volatile memory of said removable TPM subsystem module;
    wherein said controller of said system planar is configured to only allow said information handling system to boot if said binding information read directly back across the separate dedicated direct communication path from said non-volatile memory of said removable TPM subsystem module matches unique information associated with said system planar in a manner that verifies binding of said TPM subsystem module to said system planar separately from said TPM device upon every attempted boot of the information handling system; and
    where the TPM device that is separate from the non-volatile memory is configured to perform TPM processing tasks including cryptographic key generation and control, remote attestation, sealing, binding, random number generation, and hardware authentication for the information handling system.

2. The information handling system of claim 1, wherein said controller of said system planar is configured to permanently write said binding information to said non-volatile memory of said removable TPM subsystem module.

3. The information handling system of claim 1, wherein said controller of said system planar comprises a server baseboard management controller (BMC).

4. The information handling system of claim 1, wherein said binding information comprises a unique identifier associated with said system planar; and wherein said unique identifier of said system planar is permanently written in said non-volatile memory of said removable TPM subsystem module.

5. The information handling system of claim 1, wherein said information handling system comprises a desktop computer, notebook computer or server; wherein said system planar comprises a motherboard for said desktop computer, notebook computer or server; and wherein said removable TPM subsystem module comprises a plug-in module removably coupled to said motherboard.

6. The information handling system of claim 5, wherein said controller of said system planar comprises a server baseboard management controller (BMC).

7. The information handling system of claim 1, wherein a unique identifier is associated with said system planar; and wherein said binding information comprises an encrypted version or hash value or hash digest of said unique identifier.

8. The information handling system of claim 1, where the removable TPM subsystem module is non-permanently attached to the system planar via connectors.

9. The information handling system of claim 1, where said controller of said system planar is coupled to directly read said non-volatile memory of said removable TPM subsystem module by a dedicated signal conductor or bus line that is not connected to the TPM device of the removable TPM subsystem module.

10. The information handling system of claim 1, wherein said controller of said system planar is configured to halt the information handling system if said binding information read directly back from said non-volatile memory of said removable TPM subsystem module does not match unique information associated with said system planar.

11. The information handling system of claim 1, wherein said controller of said system planar is configured to hold the removable TPM subsystem module in reset if said binding information read directly back from said non-volatile memory of said removable TPM subsystem module does not match unique information associated with said system planar.

12. The information handling system of claim 1, wherein said TPM device is not coupled by a direct communication path to the controller of said system planar.

13. A method of binding a removable trusted platform module (TPM) to a system planar of an information handling system, comprising:
    providing a system planar;
    providing a removable TPM subsystem module for said system planar, said removable TPM subsystem module comprising a TPM device and non-volatile memory that is separate from the TPM device, the TPM device itself including a TPM cryptographic processor or microcontroller together with associated memory, said TPM device being configured to perform TPM processing tasks including cryptographic key generation and control, remote attestation, sealing, binding, random number generation, and hardware authentication for the information handling system;

permanently writing binding information in said non-volatile memory that is separate from the TPM device of said removable TPM subsystem module, said binding information being unique to said system planar;

directly reading said binding information from said non-volatile memory of said removable TPM subsystem module across a dedicated direct communication path that is separate from the TPM device in a manner that is separate and independent from the TPM device;

upon every attempted boot of the information handling system performing the step of verifying binding of said TPM subsystem module to said system planar in a manner separate from said TPM device by only allowing said information handling system to boot if said binding information read back from said non-volatile memory of said removable TPM subsystem module matches unique information associated with said system planar.

14. The method of claim 13, wherein said system planar further comprises a controller; and wherein said method further comprises:

using said controller of said system planar to permanently write said binding information to said non-volatile memory that is separate from the TPM device of said removable TPM subsystem module;

using said controller of said system planar to read said binding information from said non-volatile memory that is separate from the TPM device of said removable TPM subsystem module; and using said controller of said system planar to only allow said information handling system to boot if said binding information read back from said non-volatile memory of said removable TPM subsystem module matches unique information associated with said system planar.

15. The method of claim 14, wherein said controller of said system planar comprises a server baseboard management controller (BMC).

16. The method of claim 13, wherein said binding information comprises a unique identifier associated with said system planar; and wherein said method further comprises permanently writing said unique identifier of said system planar in said non-volatile memory of said removable TPM subsystem module.

17. The method of claim 13, wherein said information handling system comprises a desktop computer, notebook computer or server; wherein said system planar comprises a motherboard for said desktop computer, notebook computer or server; and wherein said removable TPM subsystem module comprises a plug-in module removably coupled to said motherboard.

18. The method of claim 17, wherein said system planar further comprises a controller; and wherein said controller of said system planar comprises a server baseboard management controller (BMC).

19. The method of claim 13, further comprising associating a unique identifier with said system planar; and creating an encrypted version or hash value or hash digest of said unique identifier for said binding information.

20. The method of claim 13, further comprising:

providing two or more removable TPM subsystem modules, each of said removable TPM subsystem modules comprising a TPM device and non-volatile memory, said TPM device of each of said removable TPM subsystem modules being of a different type than the TPM device of each other of said removable TPM subsystem modules;

selecting only one of said different type removable TPM subsystem modules for use with said system planar;

permanently writing binding information in said non-volatile memory of said selected removable TPM subsystem module, said binding information being unique to said system planar;

reading said binding information from said non-volatile memory of said selected removable TPM subsystem module; and only allowing said information handling system to boot if said binding information read back from said non-volatile memory of said selected removable TPM subsystem module matches unique information associated with said system planar.

21. The method of claim 13, further comprising providing the removable TPM subsystem module as a removable TPM subsystem module that is non-permanently attached to the system planar via connectors.

22. The method of claim 20, further comprising:

providing the system planar without a TPM subsystem module for assembly to other hardware components of the information handling system that are external to the system planar to assemble the information handling system;

assembling the system planar with other hardware components of the information handling system that are external to the system planar to assemble the information handling system; and performing the step of selecting one of said different type removable TPM subsystem modules for use with said system planar at the same time as assembling the system planar with other hardware components of the information handling system.

23. The method of claim 22, further comprising:

providing the system planar without a TPM subsystem module for assembly to other hardware components of the information handling system that are external to the system planar to assemble the information handling system;

assembling the system planar with other hardware components of the information handling system that are external to the system planar to assemble the information handling system; and assembling the selected one of said different type removable TPM subsystem modules with said system planar following the step of assembling the system planar with other hardware components of the information handling system.

24. The method of claim 22, further comprising:

assembling the selected one of said different type removable TPM subsystem modules with said system planar; and removing the assembled removable TPM subsystem module from the system planar.

25. The method of claim 20, further comprising:

providing the system planar without a TPM subsystem module for assembly to other hardware components of the information handling system that are external to the system planar to assemble the information handling system;

assembling the system planar with other hardware components of the information handling system that are external to the system planar to assemble the information handling system;

assembling the selected one of said different type removable TPM subsystem modules with said system planar; and removing the assembled removable TPM subsystem module from the system planar.

26. The method of claim 13, further comprising:
permanently writing the binding information to the non-volatile memory by a dedicated signal conductor or bus line that is not connected to the TPM device of the removable TPM subsystem module;
reading said binding information from said non-volatile memory across the dedicated signal conductor or bus line that is not connected to the TPM device of the removable TPM subsystem module; and
only allowing said information handling system to boot if said binding information read back across the dedicated signal conductor or bus line from said non-volatile memory of said removable TPM subsystem module matches unique information associated with said system planar.

27. The method of claim 13, further comprising halting the information handling system if said binding information read directly back from said non-volatile memory of said removable TPM subsystem module does not match unique information associated with said system planar.

28. The method of claim 13, further comprising holding the removable TPM subsystem module in reset if said binding information read directly back from said non-volatile memory of said removable TPM subsystem module does not match unique information associated with said system planar.

29. A removable TPM subsystem module, comprising:
a TPM device configured to perform trusted platform module processing tasks;
non-volatile memory coupled to said TPM device; and
one or more connectors, said one or more connectors configured to removably mate with one or more corresponding connectors of a system planar of an information handling system to couple said non-volatile memory to a controller of said system planar across a dedicated direct communication path that is separate from the TPM device such that said non-volatile memory directly communicates with a controller of said system planar across the dedicated direct communication path that is separate from the TPM device, and such that said TPM device is not coupled by a direct communication path to the controller of said system planar;
wherein binding information associated with a given system planar of an information handling system is permanently written in said non-volatile memory;
wherein said binding information comprises a unique identifier associated with said given system planar; and
wherein the TPM device itself includes a TPM cryptographic processor or microcontroller together with associated memory, the TPM device being configured to perform TPM processing tasks including at least one of cryptographic key generation and control, remote attestation, sealing, binding, random number generation, hardware authentication, or a combination thereof.

30. The removable TPM subsystem module of claim 29, wherein said information handling system comprises a desktop computer, notebook computer or server; wherein said system planar comprises a motherboard for said desktop computer, notebook computer or server; and wherein said removable TPM subsystem module comprises a plug-in module configured to be removably coupled to said motherboard such that said non-volatile memory communicates with said controller of said system planar.

31. The removable TPM subsystem module of claim 29, where said one or more connectors are configured to removably mate with one or more corresponding connectors of a system planar of an information handling system such that said removable TPM subsystem module is non-permanently attached to the system planar via the removably mated connectors of the TPM subsystem module and the system planar.

* * * * *